United States Patent [19]

Mikolics et al.

[11] 4,006,596
[45] Feb. 8, 1977

[54] COOLING-WATER SUPPLY SYSTEM WITH SELF-ADJUSTING HYDRAULICS

[75] Inventors: Sándor Mikolics; Károly Ziegler; Viktor Homola, all of Budapest, Hungary

[73] Assignee: Novex Talalmanyfejlesztö es Ertekesitö Külkereskedelmi Rt., Budapest, Hungary

[22] Filed: Dec. 18, 1975

[21] Appl. No.: 642,193

Related U.S. Application Data

[63] Continuation-in-part of Ser. No. 488,773, July 15, 1974, Pat. No. 3,927,531.

[30] Foreign Application Priority Data

July 25, 1973 Hungary .............................. MI 541

[52] U.S. Cl. .................................. 60/690; 165/45; 137/566
[51] Int. Cl.² .......................................... F01K 9/00
[58] Field of Search .................... 60/690, 692, 693; 165/45, 66, 110; 137/566

[56] References Cited
UNITED STATES PATENTS 1,982,305  11/1934  Hunicke .......................... 165/66 X
3,105,472  10/1963  Jasper .......................... 137/566 X

*Primary Examiner*—Allen M. Ostrager
*Attorney, Agent, or Firm*—Karl F. Ross; Herbert Dubno

[57] ABSTRACT

Cooling water is supplied to a load, e.g. a thermal-power station, from a source of water such as a lake or stream susceptible to changes in level. The system comprises a first pump drawing water from the source, a filter arrangement downstream of the first pump, a duct downstream of the filter arrangement and a second pump connected between the duct and the input side of the load. The downstream side of the load, from which the warm water emerges, is passed through a second duct and then preferably through a warm-water level control arrangement before being disposed in a sink or other basin. A connection between the discharge duct and the feed duct is permanently maintained and allows water to flow from the feed duct to the discharge duct or vice versa in dependence upon the relative quantities of liquid displaced by the pump. As a result, the water fed through the second pump can have its temperature adjusted by mixing with warm water automatically.

4 Claims, 2 Drawing Figures

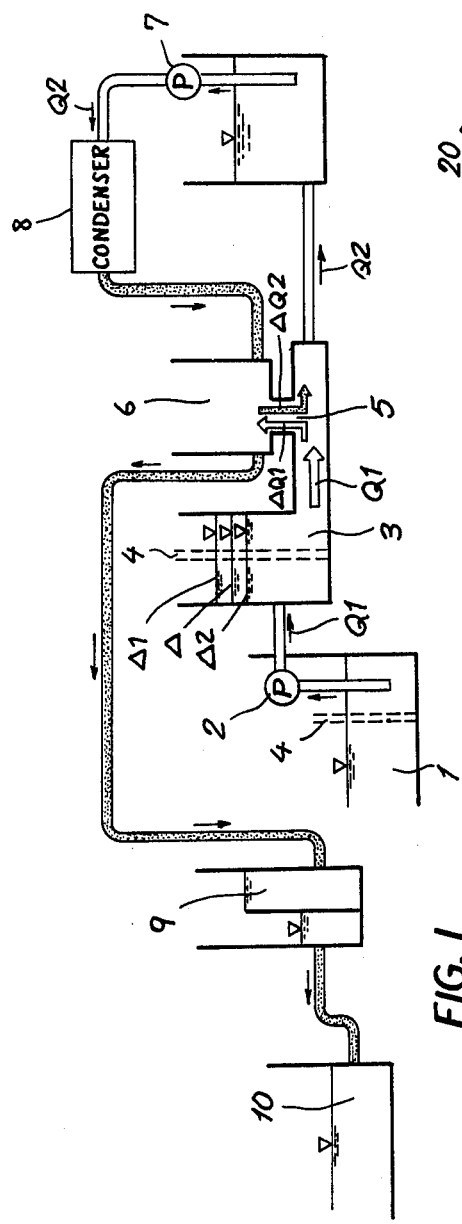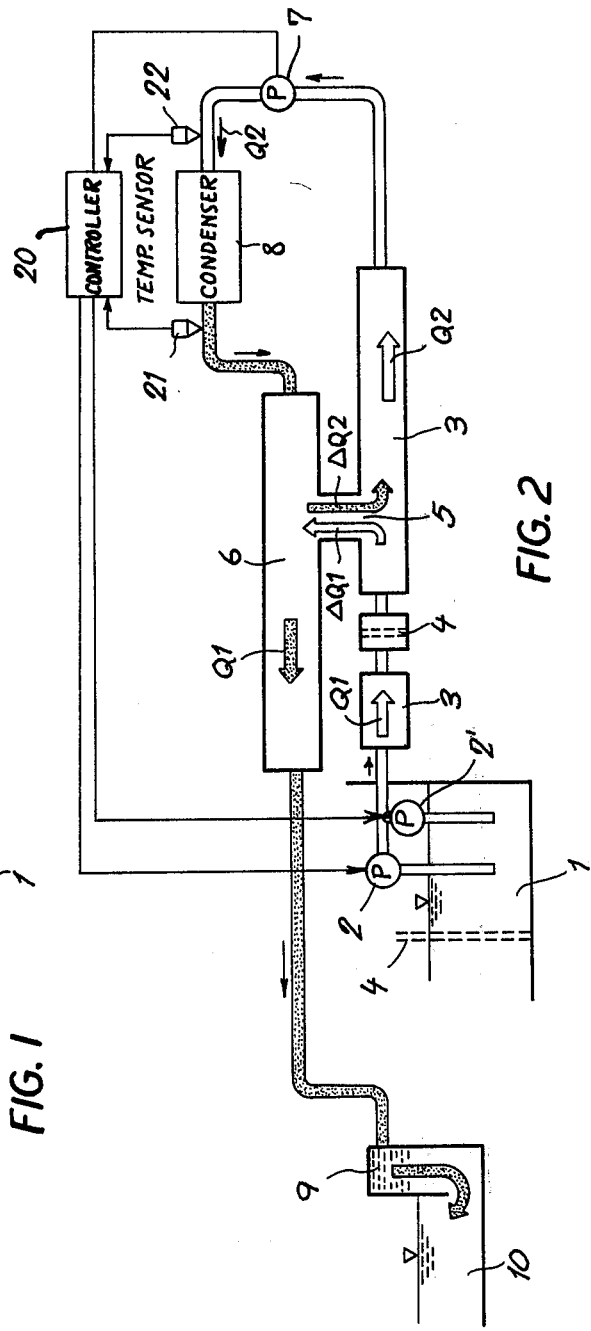
FIG. 1
FIG. 2

COOLING-WATER SUPPLY SYSTEM WITH SELF-ADJUSTING HYDRAULICS

CROSS REFERENCE TO RELATED APPLICATION

This application is a continuation-in-part of copending application Ser. No. 488,773 filed July 15, 1974, now U.S. Pat. No. 3,927,531.

FIELD OF THE INVENTION

The invention relates to a method of and an apparatus for the supply of water from a source (e.g. a lake, stream or other body of water) to a load (e.g. a heat exchanger or condenser of the cooling system of a thermal-power generating station).

BACKGROUND OF THE INVENTION

As noted in application Ser. No. 488,773, many large industrial enterprises, particularly fresh-water-cooled thermal-power stations, require the supply and disposal of large but regulated quantities of water, especially for cooling purposes.

When water is to be drawn from a natural water supply (e.g. a lake or stream), the control system must be able to take into account:

a. fluctuating requirements of the load;
b. fluctuations in water level of the source; and
c. possible breakdown of intake machinery and filters.

In addition, the system must provide water of substantially constant temperature, must be able to defreeze or melt ice which is found in the water supply, and must be able to filter undesirable materials from the water.

OBJECTS OF THE INVENTION

It is the principal object of the present invention to provide a method and an apparatus for supplying cooling water from a variable-level source to a load whereby the aforementioned disadvantages are obviated and greater control can be obtained with a minimum of complex electromechanical devices and automatic equipment.

It is also an object of the invention to provide an improved cooling-water supply system which will fulfill the requisite functions, as outlined above, with a minimum of cost.

It is a further object of the invention to provide a method of and an apparatus for the supply of coolant to a thermal power station or like load in which the effect of breakdown of the intake equipment is minimized.

Still another object of the invention is to provide for improved control of the temperature of the cooling water supplied to a load, such as a condenser or heat exchanger of a thermal power station.

SUMMARY OF THE INVENTION

According to the present invention, the load is provided with a supply or inlet branch and a discharge or outlet branch, the first leading from a source of water and the second leading to a disposal site or sink for warm water. According to the invention, the inlet branch is provided with a first pump which is located at the upstream end of the inlet branch and supplies water to a first or inlet conduit, a second pump being disposed between the inlet conduit and the intake side of the load, e.g. a heat exchanger or condenser of a thermal power station. The outlet branch extends, as noted, from the discharge or outlet side of the load to the sink through a second or discharge conduit, the two conduits being permanently interconnected. The connection between the two conduits is located, according to the invention, between the two pumps. With a system as just described, a quantity difference between the displacements of the two pumps will effect mass exchange between the inlet and discharge conduits at their connection point. When this mass exchange is a transfer of warm water from the discharge conduit to the intake conduit, the water temperature of the mixture supplied to the load is increased. When the relative displacement of the two pumps is such as to favor a flow of cool water from the intake conduit through the bypass into the discharge conduit, the volume of water supplied to the load is reduced.

In the event of breakdown of the intake or first pump, a circulation may be maintained by the second pump, through the bypass, so that in an emergency no loss of cooling power occurs. Furthermore, should breakdown of the load necessitate a complete cut-off of the supply of water thereto, the second or feed pump can be stopped and water will continue to be circulated through the bypass to the discharge conduit and thence to the sink. This latter mode of operation decreases the inertia of the system and enables a rapid restarting of the cooling operation.

The bypass is, according to the invention, permanently open so that all temperature control at the inlet side to the load is effected by differential pumping operation. In other words, the branch going to the load of the cooling circuit is permanently connected in the region between the two pumping stages to a branch or section leading from the load but prior to its discharge into the receiver of warm water. According to a feature of the invention, the duct of the warm branch is provided with level-control means, preferably including a spillway or other water-level regulating device which must be traversed by the warm water prior to its discharge into the "sink" or warm-water reservoir or receptacle.

According to another feature of the invention the temperature of the cooling water reaching the second pumping stage and the condenser or other load is adjusted to the temperature of the water reaching the first pumping stage or to any higher temperature solely by bypassing water through the permanent connection mentioned above. If no bypassing of the warm water into the water-supply conduit is desirable, the rate of displacement of the first pump is maintained significantly in excess of the rate of displacement of the second pump. The differential operation of the pump in the manner indicated can be controlled by temperature sensors responsive to the temperature at the inlet or discharge side of the condenser, or to both temperatures.

Furthermore, the first pumping stage may comprise a multiplicity of pumps operating into a common cold-water delivery branch.

The system according to the present invention has the significant and important feature that, instead of uncertain water-delivery measurements and controllers, a free-water-surface system is used which eliminates the need for mechanical devices such as valves, sluices and the like, by making use of the self-adjusting characteristics of the hydraulic system. The self-adjusting connection of the hot and cold water ducts is also used when at least one of the two duct networks is a closed-pipeline system. In other words, when the discharge line is not provided with an overflow-type level controller but is merely a pipeline, the system of the present invention has been found to be desirable.

According to the invention cooling water from a stream, reservoir or lake, serving as the source, is fed through ducts, channels or the like to the condenser, preferably through a filter which may be disposed between the first and second pumping stages. From the load, i.e. the condenser of the power station, the warm water is returned without filtering but preferably through a level-controller of the weir or overflow type, to the ultimate receptacle.

The system of the present invention has the following advantages:

It allows the water quantity to meet the water demand of the second stage pump, even if this water demand increases or otherwise varies rather suddenly, independently of the water quantity drawn in by the first stage.

It allows the temperature of the cooling water reaching the condensers to be adjusted to that of the cooling water entering the first pumping stage or to any desired higher temperature, simply by control of the relative quantities of water delivered by the pumps per unit time.

It allows control of the temperature of the water at the inlet and outlet sides of the heat exchanger to be used as the set point for controlling variables for the system used to regulate the operation of the pumps.

It allows operational safety by providing for a plurality of pumps feeding the first stage and working into a common filter system and duct arrangement.

It allows for hydraulic self-compensation and thereby increases operational safety, as compared with systems using complex electromechanical control devices.

It permits operation of cooling flow through the load even with breakdown of the first stage pumps, clogging of the intake filters and other malfunctions in the first stage system.

The simplified system reduces the number of inspections and number of individuals required to inspect and control the device.

The system can be operated with rapid mechanized cleaning every five years and substantial overhaul in twenty-to-fifty-year periods, as contrasted with annual repair and five-year overhaul intervals of conventional systems.

It is possible to maintain the temperature at the inlet side of the heat exchanger (condenser) very economically with a minimum of cost, thereby conserving energy.

The controlled water temperature allows greater operational stability of modern giant but sensitive turbines and other similar loads, thereby saving repair and replacement costs.

BRIEF DESCRIPTION OF THE DRAWING

The above and other objects, features and advantages of the present invention will become more readily apparent from the following description, reference being made to the accompanying drawing in which:

FIG. 1 is a flow diagram of a first embodiment of the invention; and

FIG. 2 is a flow diagram of a second embodiment.

SPECIFIC DESCRIPTION

In FIG. 1, we show a primary source of cooling water 1, such as a stream, canal, reservoir or lake, which supplies the intake side of a first pump 2 through filters which have been diagrammatically represented at 4.

The outlet side of the pump 2 is connected to a cooling water inlet passage 3 having a vertical column at its inlet side in which a liquid head can be maintained. The liquid head can vary between a median position represented at $\Delta$ upwardly and downwardly by distances $\Delta_1$ and $\Delta_2$, respectively.

Filters are provided between the outlet of the pump 2 and the remainder of the cooling water channel. The cooling water flow delivered by the pump 2 has been represented as $Q_1$ and corresponds to the cooling water flow through the inlet channel 3.

From the inlet channel 3, the cooling water is drawn at a rate $Q_2$ via pump 7 from a supply reservoir whose level determines the level of the liquid in the column of inlet channel 3. The second pump 7 feeds the condenser 8 of the power plant. The warm water effluent from this condenser, generally flowing at a rate $Q_2$, assuming no losses within the condenser, flows into a pressurized warm-water duct 6 which is under a head determined by the warm-water level control 9 at the downstream side of this channel. Element 9 has an overflow, siphon or the like which regulates the level of liquid in the channel 6 and hence the pressure of the upper end of the permanently open bypass 5.

From the warm-water level control 9, the effluent from the condenser flows into the discharge receptacle 10 which may be the same source of water at a location downstream from the intake of pump 2.

From FIG. 1 it will be apparent that it is possible to maintain a balance $Q_1 = Q_2$ whereby the flow across the permanently open bypass 5 between the cooling channel 3 and the warm-water channel 6 is zero. ($Q_1 = Q_2$; $\Delta_1 = \Delta_2 = 0$; $\Delta Q_1 = \Delta Q_2 = 0$.)

If it is desired to increase the temperature of the cooling water supplied to the condenser 8, pump 7 is accelerated relative to pump 2 so that the quantity $Q_2$ will be greater than $Q_1$ and warm water will flow as represented by $\Delta Q_2$ from the channel 6 into the channel 3, driven by the head difference $\Delta_2$.

Of course, when cooler water is required at the discharge side, pump 2 may be accelerated (relative to pump 1) to raise the head in channel 3 by $\Delta_1$, thereby driving a flow $\Delta Q_1$ from the cooling channel 3 into the warm water channel 6. Thus, when $Q_1 > Q_2$, then $\Delta_1 > 0$ and $\Delta Q_1 = Q_1 - Q_2 > 0$ and $\Delta Q_2 = 0$.

If $Q_1 < Q_2$, then $\Delta_2 > 0$ and, therefore, $\Delta Q_2 = Q_2 - Q_1 > 0$ and $\Delta Q_1 = 0$.

In FIG. 2 similar elements are represented by similar reference numerals except that in this embodiment the duct 6 is not open to the atmosphere and hence cannot sustain variations in head. However, the level control at 9 constitutes a siphon arrangement as shown at the left hand side of this Figure.

In addition, a plurality of intake pumps 2, 2' are provided, the pumps being operated by a controller 20 with inputs represented at 21 and 22 for the discharge temperature and intake temperature at the condenser 8. When it is necessary to reduce the temperature at the inlet to the condenser 8, the controller 20 causes the pump 7 to operate more rapidly or operates both pumps 2 and 2' and pump 7 at a rapid rate. When a higher temperature is required at the intake to the condenser, one of the pumps 2 and 2' may be cut off so that the quantity of water traversing the bypass in the direction $\Delta Q_2$ increases.

While the system of FIG. 2 operates generally similarly to that of FIG. 1, the following considerations are involved:

If $Q_1 = Q_2$, then $\Delta Q_1 = \Delta Q_2 = 0$.
If $Q_1 < Q_2$, then $\Delta Q_1 = Q_1 - Q_2$ and $\Delta Q_2 = 0$.
If $Q_1 > Q_2$, then $\Delta Q_2 = Q_2 - Q_1$ and $\Delta Q_1 = 0$.

Thus in FIG.2 similar conditions apply and hence corresponding reference numerals have been used for the several parts. The sole difference, of course, is that the channels 3 and 6 are here closed passages so that the pressure developed in them is the confining pressure against which the respective pumps 2 and 7 operate.

We claim:

1. A method of operating a cooling-supply system for the condenser of a power plant which comprises the steps of:
    pumping cooling water from a source through a cooling-water channel at a first location;
    pumping water from said channel at a second location through said condenser and through a warm-water channel;
    collecting water from said warm-water channel in a reservoir;
    maintaining the level of water in said reservoir substantially constant;
    bypassing said channels into one another; and
    controlling the flow of water from one channel into the other at the bypass solely by the relative rates pumped at said location, thereby regulating the temperature of the water entering said condenser.

2. The method defined in claim 1, further comprising the step of maintaining a constant water head in said warm-water channel.

3. A cooling-water system for the condenser of a power plant, comprising:
    a source of cooling water;
    a first pump connected to said source for displacing cooling water at a first rate;
    a cooling-water channel connected to said first pump for conducting the cooling water therefrom;
    a second pump drawing water from said cooling channel and pumping it through said condenser at a second rate;
    a warm-water channel connected to said condenser for conducting warm water therefrom;
    a valveless bypass interconnecting said channels for permitting selected flow from one of said channels to the other in either direction through said bypass in dependence upon the relative rates; and
    temperature sensing means at said condenser for controlling at least one of said pumps.

4. The system defined in claim 3 wherein said cooling-water channel comprises a duct having an inlet side and an outlet side, means forming a column adapted to sustain a water head at said inlet side, said first pump being connected to said duct at said inlet side, said second pump being connected to said duct at an outlet side thereof and said bypass being connected to said duct intermediate said inlet and outlet sides; a supply reservoir is provided between the intake of said second pump and said outlet side of said duct for automatic maintenance of the same water level in said reservoir as in said column; said warm-water channel is provided with a level-maintaining device for maintaining a constant water level therein.

* * * * *